Apr. 3, 1923.
M. H. JUDGE
1,450,443
GATE LATCH
Filed Apr. 7, 1921
2 sheets-sheet 1
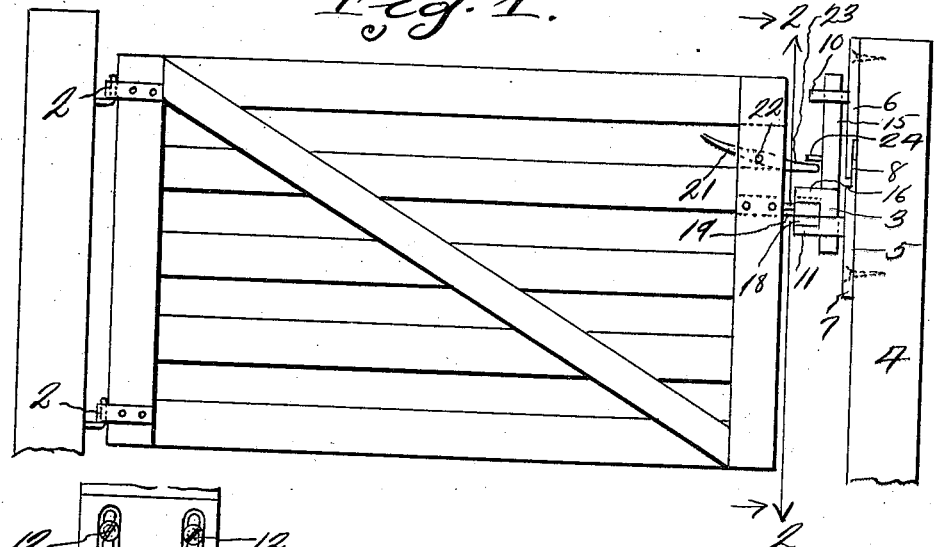
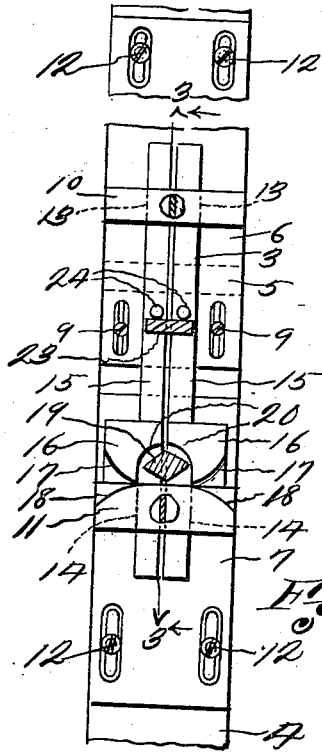
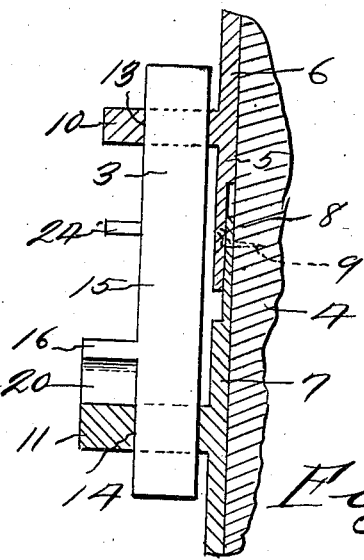
Inventor
Michael H. Judge
By Philip A. Sorrell
Attorney

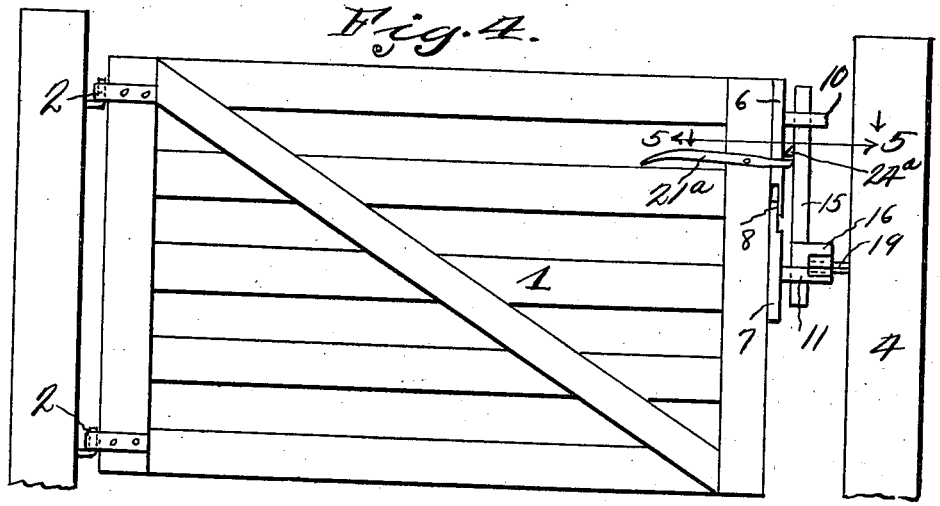
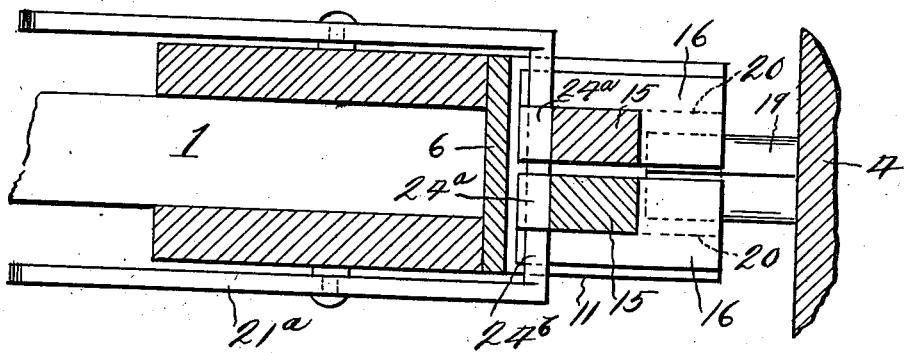

Patented Apr. 3, 1923.

1,450,443

UNITED STATES PATENT OFFICE.

MICHAEL H. JUDGE, OF GREELEY, NEBRASKA.

GATE LATCH.

Application filed April 7, 1921. Serial No. 459,277.

*To all whom it may concern:*

Be it known that MICHAEL H. JUDGE, a citizen of the United States, residing at Greeley, in the county of Greeley and State of Nebraska, has invented certain new and useful Improvements in Gate Latches, of which the following is a specification, reference being had therein to the accompanying drawing.

The invention relates to gate latches and has for its object to provide a device of this character comprising a sectional plate, each section of which is adjustable in relation to each other, said sections of the plate being provided with lugs having apertures in which lugs are vertically movable bars having recesses in enlargements thereof, which enlargements rest on the lower apertured lug of the plate and receive a projecting member carried by the free end of the gate after said projecting member has engaged a camming surface of one of the enlargements carried by one of the vertical bars and forced said bar upwardly until the gate carried member is disposed within the recesses within the enlargement of the vertical bars. Also to provide a gate latch that may be carried by the free end of the gate if so desired.

A further object is to provide the lower lug adjacent its sides with double surfaces for assisting in guiding the gate carried projection into position when said gate is closed. Also to provide the vertically movable bars with lugs with which lugs a lever carried by the gate cooperates whereby upon manual operation of the lever both of the vertically movable bars may be raised for allowing the gate to be opened in either direction.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of a special form of swinging gate showing the latch applied thereto.

Figure 2 is a vertical sectional view taken on line 2—2 of Figure 1.

Figure 3 is a vertical sectional view taken on line 3—3 of Figure 2.

Figure 4 is a front elevation of a gate showing the latch carried by the gate.

Figure 5 is a horizontal sectional view taken on line 5—5 of Figure 4.

Referring to the drawings, the numeral 1 designates a conventional form of swinging gate which swings on the hinges 2, and 3 designates a latch which is carried by a gate post 4. The latch 3 comprises a plate 5 formed in two sections 6 and 7, which sections are overlapped as at 8 and extending through said overlapped portion and through elongated apertures therein are securing screws 9 by means of which screws the plate sections 6 and 7 may be adjusted in relation to each other for adjusting their lugs 10 and 11 closer or further away from each other and particularly for adjusting the lug 11 to various positions incident to sagging of the gate 1 or for any other reason. The plate sections 6 and 7 are additionally secured to the post 4 by means of screws 12 which pass through elongated apertures in said plate sections. Vertically slidable in apertures 13 and 14 of the lugs 10 and 11 carried by the plate sections 6 and 7 are vertically disposed spaced bars 15, which bars 15 by being spaced will not bind as one or the other is moved vertically during a gate latching operation. The bars 15 are provided with enlargement 16, which enlargements rest upon the upper surface of the lug 11 and limit the downward movement of the bars 15 after a latching operation. The enlargements 16 are bevelled as at 17 and the lug 11 is bevelled as at 18, said bevels being engaged by a projection 19 carried by the free end of the gate which projection is substantially diamond shaped in cross section and when the diamond shaped projection 19, during a gate closing operation is moved to the position shown in Figure 2 from either direction, one of the vertically disposed bars 15 is forced upwardly until the projection 19 is positioned on the upper surface of the plate 11 centrally, at which time the bar 15 which has been moved drops downwardly permitting the enlargement to rest on lug 11 and the projection 19 is held within the registering recesses 20 in the enlargement 16 of the bars 15. It will be seen that the gate will be held against opening from either direction.

The free end of the gate is provided with a lever 21 which is pivoted as at 22 to the gate and has its arm 23 when the gate is closed disposed beneath the lugs 24 carried by the bars 15, said lever 21 forming means whereby when the same is depressed at its handle end, which end is lighter than the end 23 permitting end 23 to drop back to free position when depression at handle is released, the end 23 will engage the under surfaces of the lugs 24 and simultaneously move the bars 15 upwardly, after which the gate may be opened in either direction.

Referring to Figures 4 and 5 it will be seen that the structure is substantially the same with the exception that the vertically disposed bars 15 are carried by the free end of the gate instead of by the gate post 4. In this form the bars 15 are provided with lugs 24$^a$ on their rear faces, with which lugs the transverse portion 24$^b$ of a pivoted U-shaped operation lever 21$^a$ cooperates, whereby both bars 15 may be simultaneously raised.

From the above it will be seen that a gate latch is provided which is positive in its operation, and one wherein the gate may be opened and latched from either side.

The invention having been set forth what is claimed as new and useful is:—

1. The combination with a swinging gate, of a latch for said gate, said latch comprising a plate formed from overlapped vertical sections adjustable in relation to each other, apertured lugs carried by said plate sections, vertically disposed independent spaced bars slidably mounted in the apertures of said lugs, said bars being provided with enlargements normally engaging the upper face of the lower lug, recesses in the adjacent inner faces of the enlargements, the outer sides of said enlargements being bevelled outwardly and upwardly, the outer portion of the lower lug being bevelled downwardly and outwardly, a projection carried by the gate and adapted to engage said bevelled surfaces and move one of the vertically movable bars upwardly and pass into the recesses in the adjacent inner faces of the enlargement according to the direction of movement of the gate, lugs carried by the vertically slidable bars and a lever pivoted to the free end of the gate and having its forward end disposed beneath the lugs of the bars and forming means for simultaneously raising said bars.

2. The combination with a gate, of a latch therefor, said latch comprising a plate, spaced apertured lugs, vertically slidable independent bars slidable in the apertures of said lugs, said bars having enlargements engaging the upper surface of the lower lug and having recesses in their inner adjacent faces, a projection carried by the gate and adapted to be received in the recesses, bevelled surfaces carried by the enlargements and adapted to be engaged by the gate projection whereby one of the bars will be moved upwardly during a gate latching operation, lugs carried by the bars and a single lever carried by the gate for engaging the lugs carried by the bars for simultaneously raising the vertically disposed bars and releasing the gate whereby it may be opened inwardly or outwardly.

3. A gate latch comprising a plate having apertured lugs, vertically movable independent bars disposed in said apertures, said bars being provided with enlargements engaging the upper side of the lower lug of the plate and having recesses in the inner adjacent face of the enlargements, a projection carried by the free end of the gate and adapted to be received in the recesses of the enlargement, the outer lower corners of the enlargements being bevelled outwardly and upwardly forming camming surfaces for engagement by the projection of the gate during a gate closing operation from either direction, and means whereby the vertically slidable bars may be simultaneously raised.

In testimony whereof I hereunto affix my signature.

MICHAEL H. JUDGE.